United States Patent [19]

Yoshikawa et al.

[11] Patent Number: 4,680,430
[45] Date of Patent: Jul. 14, 1987

[54] COORDINATE DETECTING APPARATUS

[75] Inventors: Kazuo Yoshikawa, Atsugi; Toru Asano, Kawasaki; Hisashi Yamaguchi, Atsugi; Hideaki Takizawa; Shizuo Andoh, both of Kawasaki, all of Japan

[73] Assignee: Fujitsu Limited, Kanagawa, Japan

[21] Appl. No.: 706,224

[22] Filed: Feb. 27, 1985

[30] Foreign Application Priority Data

Feb. 29, 1984 [JP] Japan .................................. 59-37919
Feb. 29, 1984 [JP] Japan .................................. 59-37914
Feb. 29, 1984 [JP] Japan .................................. 59-37915

[51] Int. Cl.$^4$ ............................................. G08C 21/00
[52] U.S. Cl. .................................. 178/19; 340/365 S
[58] Field of Search ............................. 178/19, 18, 20; 340/365 C, 365 A, 712, 365 S

[56] References Cited

U.S. PATENT DOCUMENTS

| | | | |
|---|---|---|---|
| 3,449,516 | 6/1969 | Cameron et al. | 178/19 |
| 4,103,252 | 7/1978 | Bobick | 331/48 |
| 4,435,616 | 3/1984 | Kley | 178/18 |
| 4,550,310 | 10/1985 | Yamaguchi | 340/365 S |

FOREIGN PATENT DOCUMENTS 2511796 2/1983 France .
WO80/01762 9/1980 PCT Int'l Appl. .

Primary Examiner—Stafford D. Schreyer
Attorney, Agent, or Firm—Armstrong, Nikaido, Marmelstein & Kubovcik

[57] ABSTRACT

A coordinate detecting apparatus for determining the coordinate data of a point on a plane by indicating the point with a touch of a fingertip or other load to the point. The apparatus comprises a transparent resistive film forming the plane (touch panel) and a buffer circuit operating as a voltage follower circuit having substantially infinate input impedance. The buffer amplifier is operatively connected between each selected pair of facing ends of a substantially rectangular region of the resistive film, and equalizes the potentials at the ends. The change of the impedance between one of the ends and the ground is detected in accordance with the touch of the fingertip to the touch panel and is used as an original coordinate data. Further modifications concerning the avoidance of degradation in the detection quality due to fluctuations of the impedance provided by the touch of a fingertip, for example, and the methods to perform 2-dimensional coordinate detection are described.

20 Claims, 11 Drawing Figures

COORDINATE DETECTING APPARATUS

BACKGROUND OF THE INVENTION

1. Field of the Invention

The present invention relates to a coordinate detecting apparatus, and more particularly, to an analog type apparatus using a resistive film having a plane on which the position of a point whose coordinate is to be detected is indicated by applying a load impedance to the position.

With the development of office automation, there is a growing need for simple means for inputting the coordinate data of a point into a computer system. A soft-key, which is a coordinate data inputting means comprising an input panel stacked on the surface of a display device, permits the input of the coordinate of a point on the panel by only applying the touch of a fingertip, etc. to the panel. Thus, the soft-key can greatly facilitate the man-machine interaction in a computer system. For example, the selection of a menu on a display device or inputting of a pattern to a computer system can be performed without using a keyboard and only touching the input panel or writing the pattern on the panel. An exemplary application of such a soft-key has been realized in a window machine for banks or a seat reservation terminal for travel agencies. The use of the soft-key is expected to increase more and more in view of the trend toward integrated digital information networks where easy-to-operate terminals for nonspecialized persons are essential.

2. Description of the Prior Art

The coordinate data inputting technology for the above-described soft-key, is a digital type apparatus comprising a plurality of sensors disposed to form a matrix arrangement on a plane. By indicating one or a plurality of the sensors with a touch of a fingertip or pen, the coordinate data corresponding to the position(s) of the sensor(s) is applied to a control unit. However, detection accuracy in the coordinate data obtained by using such digital type means depends on the number of the sensors per inch, and is insufficient for applications requiring high resolution necessary to the inputting of a fine or complicated pattern.

Another type of coordinate inputting means using an input panel having a resistive film was first disclosed in Proc. 1971 SID, under the title of "Conducting Glass Touch Entry System" by R. K. Marson, followed by various modifications, for example, disclosed in Proc. 1973 SID, under the title of "The Analog Touch Panel" by J. A. Turner et al. In this method, a resistive film constituting an input panel is supplied with current from both ends, and the point whose coordinate on the input panel is to be detected is indicated by applying a load impedance to the resistive film at the point. The coordinate of the point is given as a function of the ratio of respective currents flowing from both ends to the load. Thus, the coordinate is originally acquired as analog data. Therefore, higher detection accuracy can be attained when compared with the above-mentioned digital type, and the detection accuracy primarily depends on the quantization characteristics of the A-D (analog-to-digital) converter used in the conversion of the original analog data to digital data.

The principle of an analog type coordinate detecting method as above will be described with reference to FIG. 1.

FIG. 1 is a circuit block diagram of a conventional coordinate detecting apparatus of the aforesaid analog type. Referring to FIG. 1, the output terminal 5 of a voltage source 8 is connected to one end 2 of a uniform resistive film 1 via a current measuring means 9. The output terminal 5 of the voltage source 8 is also connected to the other end 3 of the resistive film 1 via another current measuring means 10. Another output terminal of the voltage source 8 is connected to the ground 7. The output of the current measuring means 9 is connected to an analog-to-digital converter (ADC) 11, while the output of the current measuring means 10 is connected to another ADC 12. The outputs of both ADCs 11 and 12 are individually connected to a control unit 13.

When a load 6 which is a capacitor, for example, and has a definite impedance with respect to the ground 7, is applied to the position of a point 4 on the resistive film 1, respective currents, which are supplied by the voltage source 8, flow into the load 6 via the ends 2 and 3.

Since the resistive film 1 has a uniform resistivity, the resistance between two arbitrary points on the resistive film 1 is proportional to the distance between the points. When assuming the coordinate of the end 2 to be 0 while the coordinate of the end 3 to be 1, the coordinate x of an arbitrary point 4 on the resistive film 1 is represented by the equation $$x = R_x / (R_x + R_{1-x}) \quad (1)$$

where, $0 \leq x \leq 1$, and, $R_x$ and $R_{1-x}$ denote respective resistances between the end 2 and point 4 and between the end 3 and point 4.

The voltage drop across the resistance $R_x$ is equal to that across the resistance $R_{1-x}$, therefore, $$R_x \cdot I_x = R_{1-x} \cdot I_{1-x} \quad (2)$$

where, $I_x$ and $I_{1-x}$ denote respective currents flowing through the ends 2 and 3.

Hence, equation (1) can be represented as follows:

$$x = I_{1-x} / (I_x + I_{1-x}) \quad (3)$$

and thus, the coordinate of the point 4 can be determined by the currents $I_x$ and $I_{1-x}$, both measured by using the current measuring means 9 and 10. In the apparatus shown in FIG. 1, the value of the currents $I_x$ and $I_{1-x}$ are converted to corresponding digital data by the respective ADCs 11 and 12, and processed by the control unit 13 to provide a digital coordinate data, according to equation (3).

The conventional coordinate detecting apparatus shown in FIG. 1 uses current measuring means 9 and 10, each of which usually comprises an operational amplifier serving to provide a voltage output signal corresponding to the measured current. The coordinate detecting apparatus also requires analog-to-digital converters (ADCs) 11 and 12 of high quantization accuracy. As a result, the apparatus inevitably has a complicated circuit configuration and high cost.

SUMMARY OF THE INVENTION

It is an object of the present invention to provide a coordinate detecting apparatus comprising a simplified circuit.

It is another object of the present invention to provide a coordinate detecting apparatus of low cost.

It is yet another object of the present invention to provide a coordinate detecting apparatus having a high detection accuracy.

It is still another object of the present invention to provide a coordinate detecting apparatus which can be used as a soft-key for a computer input device when stacked on a display device.

The above objects can be achieved by providing a coordinate detecting apparatus comprising a resistive film having a plane and having an effective region used for the coordinate detecting, wherein the effective region is substantially rectangular and has a pair of ends disposed in the direction parallel to the relevant coordinate axis. A buffer circuit having an input and output, which is operatively connected to each of the ends, respectively, wherein the buffer circuit has a substantially infinite input impedance and unity voltage gain to equalize the potential at both ends. Measuring means are connected to the input of the buffer circuit to measure the impedance between the ends and ground. The point whose coordinate on the plane is to be detected is indicated by applying a load to the point.

DETAILED DESCRIPTION OF THE PREFERRED EMBODIMENTS

Figure 1:
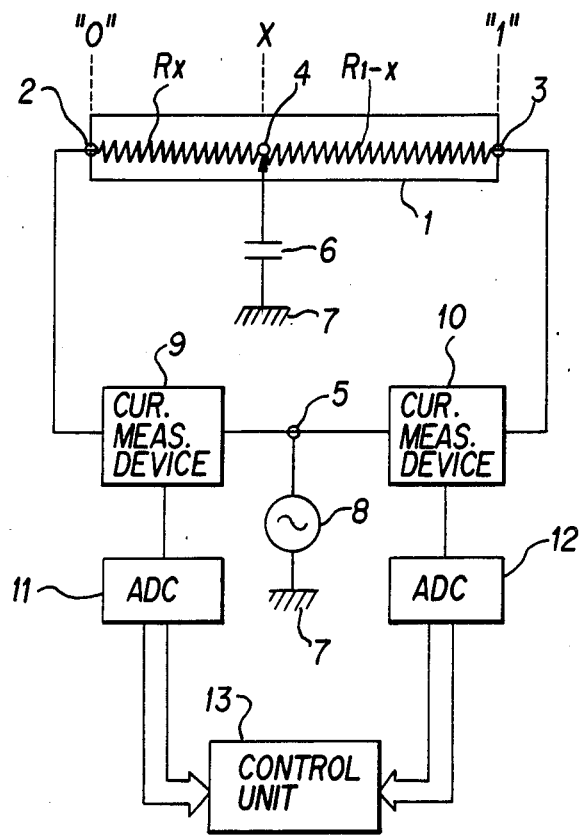
FIG. 1 is a circuit block diagram of a conventional coordinate detecting apparatus.
Figure 2:
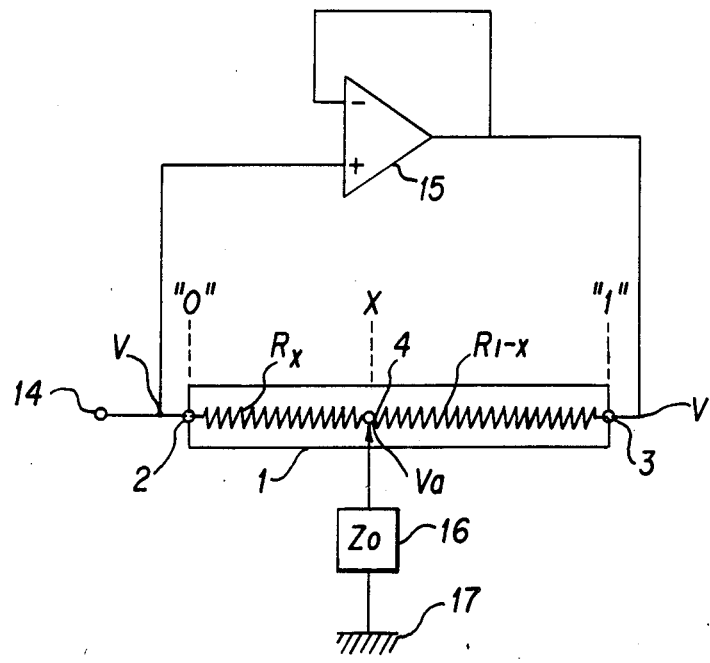
FIG. 2 is a circuit block diagram for explaining the principle of the present invention.

FIG. 2 is a circuit block diagram used for explaining the principle of the present invention. Unlike the conventional apparatus shown in FIG. 1, ends 2 and 3 of a resistive film 1 are not connected to a voltage source but the end 2 is connected to a terminal 14 and the end 3 is connected to the end 2 via a buffer circuit, for example, an operational amplifier (referred to as an op amp, hereinafter) 15 of a voltage follower mode. More specifically, the end 2 is connected to the non-inverting input (+) of the op amp 15, and the output of the op amp 15 is connected to its inverting input (−) and the end 3.

Thus, in the circuit shown in FIG. 2, the ends 2 and 3 have an equal potential with respect to the ground 17. The input impedance of the op amp 15 can be assumed to be infinite, therefore, the current flowing through the terminal 14 does not include a current component flowing from the end 3 to a point 4 on the resistive film 1, even when a load 16 is applied to the point 4.

In the following, the potential on the ends 2 and 3 with respect to ground 17 is represented by V, the potential at the point 4 with respect to the ground 17 is represented by Va, and the impedance between the terminal 14 and ground 17 is represented by Z. The impedance Z involves the respective resistances $R_x$ between the end 2 and point 4 and $R_{1-x}$ between the end 3 and point 4, and the load impedance Zo between the point 4 and ground 17, and is, therefore, referred to hereinafter as an equivalent impedance.

The present invention is based on a consideration that the coordinate x of an arbitrary point 4 on the resistive film 1 is given as a function of the equivalent impedance Z.

The value of the equivalent impedance Z can be derived as follows.

A current flowing through the load impedance Zo, which current being expressed by Va/Zo, is equal to the sum of the current flowing through $R_x$ and the current flowing through $R_{1-x}$. Both currents flowing through $R_x$ and $R_{1-x}$ are expressed by $(V-Va)/R_x$ and $(V-Va)/R_{1-x}$, respectively. Hence, $$(V-Va)/R_x + (V-Va)/R_{1-x} = Va/Zo \quad (4)$$

As mentioned above, it can be assumed that the current flowing through the terminal 14 does not include the current flowing through $R_{1-x}$, therefore, the current flowing through the equivalent impedance Z, which current being expressed by V/Z, equals to the current flowing through $R_x$, hence, $$V/Z = (V-Va)/R_x \quad (5)$$

By eliminating both V and Va from equations (4) and (5), the equivalent impedance Z is expressed as follows:

$$Z = R_x + Zo(R_x + R_{1-x})/R_{1-x} \quad (6)$$

If the resistive film 1 is formed to have the values of $R_x$ and $R_{1-x}$ sufficiently smaller than the load impedance Zo, equation (6) can approximately be $$Z \cong Zo(R_x + R_{1-x})/R_{1-x} \quad (7)$$

As described above, the coordinate x of a point on the resistive film 1 is given by $x = R_x/(R_x + R_{1-x}) \quad (8)$ accordingly, by combining equations (7) and (8), the equation representing the coordinate x as a function of the equivalent impedance Z is derived as follows $$x = 1 - Zo/Z \quad (9)$$

Therefore, if the load impedance Zo has a known value, and the value of the impedance Z is obtained by using an appropriate measuring means, the coordinate x can be determined according to equation (9).

As discussed above, in the principle of the present invention, both ends of the resistive film 1 are connected to each other via a buffer circuit operating in a voltage follower mode, and the equivalent impedance Z of the terminal 14 with respect to the ground 17 is measured when a load impedance Zo is applied to an arbitrary point 4 on the resistive film 1. The impedance Zo is selected to be sufficiently larger than the resistance of the resistive film 1. And thus, the coordinate x of the point 4 on the resistive film 1 is detected by processing both impedance data according to equation (9).

In the configuration of FIG. 2, if the load impedance Zo is capacitive, $$Z_o = 1/j\omega C_o \qquad (10)$$

where, Co represents capacitance, j and $\omega$ respectively designate the imaginary unit and an angular frequency. Accordingly, equation (7) becomes $$Z = 1/j\omega\{C_o R_{1-x}/(R_x + R_{1-x})\} \qquad (11)$$

Equation (11) means that the equivalent impedance Z between the terminal 14 and ground 17 is assumed to be composed of an equivalent capacitance expressed as follows:

$$C = C_o R_{1-x}/(R_x + R_{1-x}) \qquad (12)$$

Accordingly, the coordinate x is given by $$x = 1 - C/C_o \qquad (13)$$

As shown above, when a capacitive impedance is used for Zo, the equivalent impedance Z between the terminal 14 and ground 17 can be dealt with as an equivalent capacitance, and the coordinate x is determined by measuring relevant capacitances C and Co.

Figure 3:
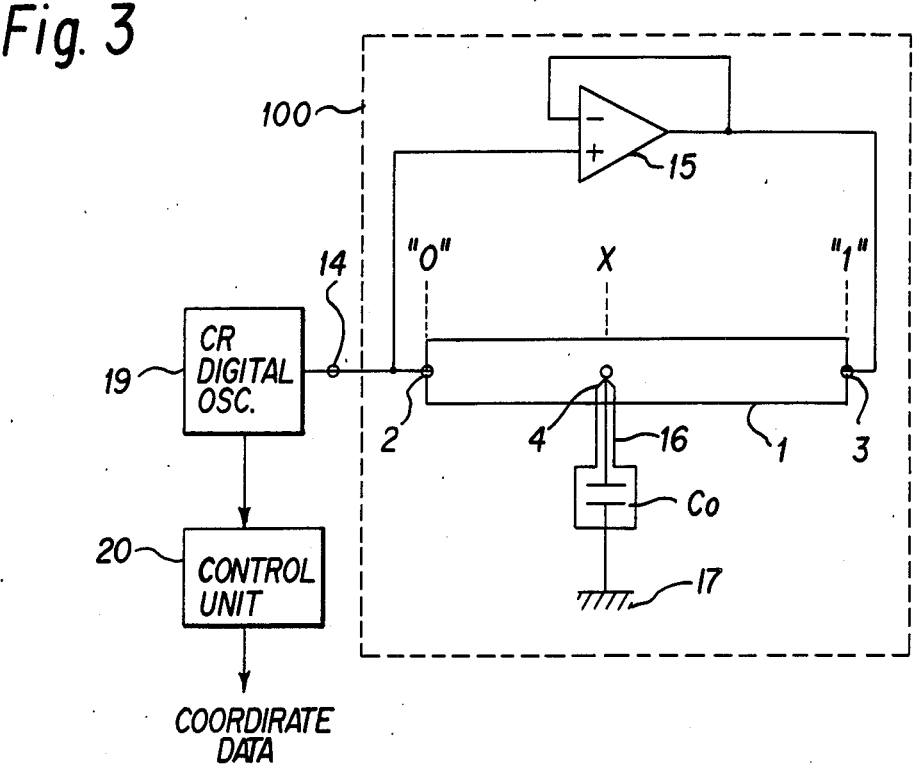
FIG. 3 illustrates an exemplary circuit configuration of a first embodiment coordinate detecting apparatus of the present invention based on the principle explained with reference to FIG. 2.

FIG. 3 illustrates an exemplary circuit configuration embodying a coordinate detecting apparatus based on the principle explained with reference to FIG. 2, wherein a capacitance Co, of the load 16 is applied to an arbitrary point 4 on the resistive film 1, and the equivalent capacitance C between the terminal 14 and ground 17 are respectively measured to determine the coordinate x of the point 4 according to equation (13). The configuration and operation of the portion enclosed by the broken line 100 are the same as those explained with reference to the corresponding part in FIG. 2.

In FIG. 3, capacitance measuring means, for example, a CR digital oscillator 19, is connected to the terminal 14, and the output of the CR digital oscillator 19 is connected to the input of a control unit 20. The CR digital oscillator 19 outputs pulses of a frequency corresponding to the time constant determined by the respective values of external resistor and capacitor connected to it. When the equivalent capacitance C is used as the external capacitor, the repetition period of the pulses output from the oscillator 19 is proportional to the equivalent capacitance C. The control unit 20 determines the repetition period of input pulses by means of a built-in timer and calculates the value of the coordinate x of the point 4 according to equation (9) or (13). The CR digital oscillator 19 may comprise an astable multivibrator, such as an NE 555 marked by Sygnetics Inc., for example.

Some quantitative discussion concerning the above process is described in the following.

An input pen having a capacitance of about 1000 pF, for example, is used for the load impedance 16. An internal clock pulse of about 6 MHz is used for the timer in the control unit 20, and therefore, the CR digital oscillator 19 is set to operate in a frequency range of tens kHz or less. A resistive film 1, having a sheet resistance in the range from 200 to 500 ohms, is generally used. Hence, in the above frequency range, the load impedance provided by the 1000 pF input pen is in a range around 5 to 15 kilohms. This impedance is ten times or more larger than the resistance of the resistive film 1 and is in accordance with the assumption used for deriving the equation (7).

A constant k, is introduced for establishing a relationship between the repetition period of the output pulses and input capacitance of the oscillator 19. That is, $$T_o = kC_o \qquad (14)$$

$$T = kC \qquad (15)$$

where, To denotes the repetition period obtained when the capacitance at the terminal 14 is Co, and T denotes the repetition period obtained when the capacitance at the terminal 14 is C.

According to the equations (14) and (15), the equation (13) expressing the coordinate x as a function of the capacitances Co and C is modified as follows:

$$x = 1 - (T/T_o) \qquad (16)$$

Hence, the coordinate x is determined by measuring the respective repetition periods corresponding to the load capacitance Co and equivalent capacitance C. According to the equation (13), x=0 results in C=Co. Therefore, the repetition period To is obtained when the load impedance Co is applied to the end 2. Then, the equivalent capacitance C is measured by applying the load capacitance Co to the point 4 whose coordinate x is to be detected. The data corresponding to the respective repetition periods To and T are stored in the memory of the control unit 20, and then, processed for providing the coordinate value x of the point, according to the formula (16).

Figure 10:
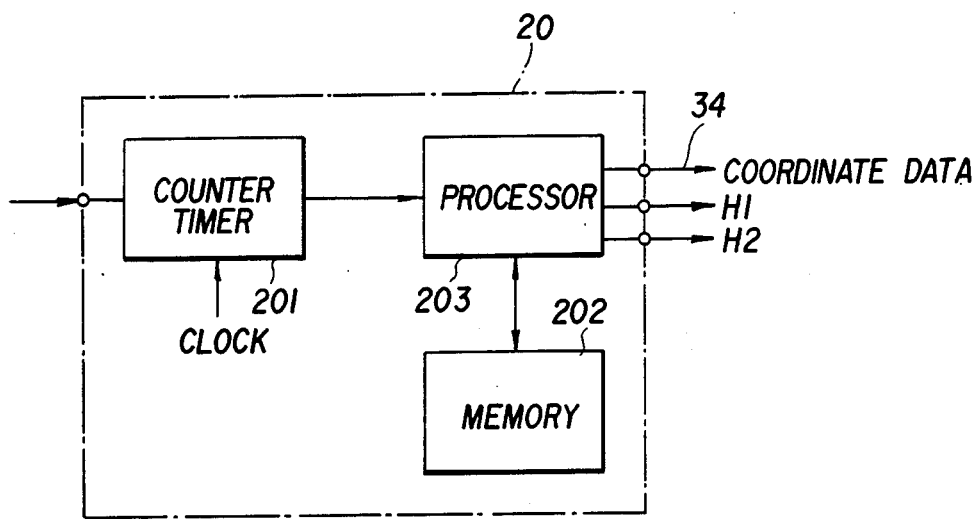
FIG. 10 illustrates a block diagram of the centrol unit used in the embodiments.
Figure 5:
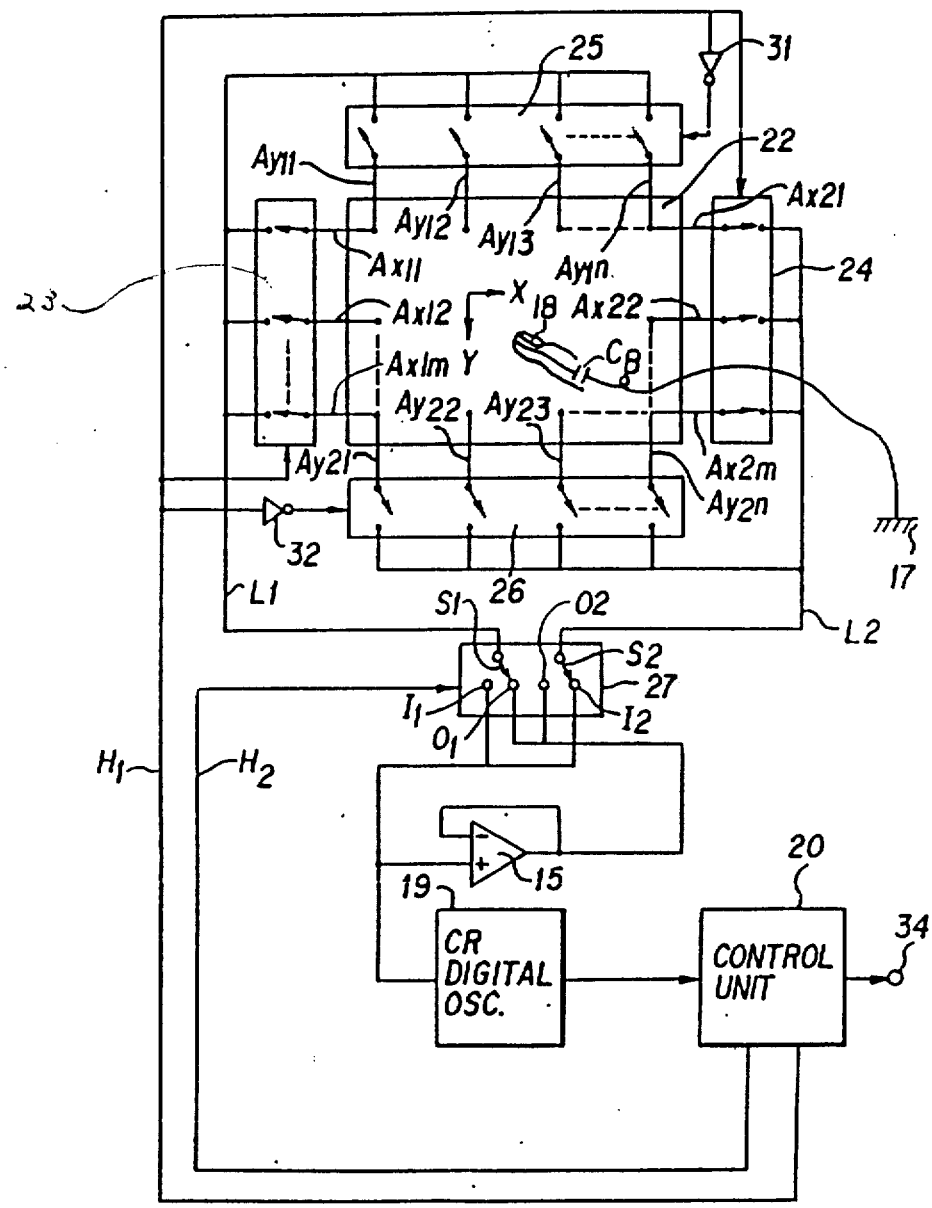

The CR digital oscillator 19 is commercially available at a low cost, and the control unit 20 comprising counter timer 201, memory 202 and processor 203 as shown in FIG. 10 are also commercially available as in the form of a 1-chip microprocessor, for example, Motorola 6801 at a low cost. Thus, the coordinate detecting apparatus of the present invention can be provided at a lower cost compared with the conventional apparatus as shown in FIG. 1, without a sacrifice in operational reliability.

Since a transparent resistive film such as that composed of indium-tin-oxide (ITO), for example, is used, the input panel of the coordinate detecting apparatus shown in FIG. 3 can be directly stacked on the surface of a display device. The apparatus can be used in an application such as a touch panel for inputting a selected menu on the display, wherein the selected menu is indicated by applying a touch of fingertip on the input panel. Because the coordinate detecting apparatus shown in FIG. 3 uses the variation of the equivalent capacitance C between the end of the resistive film 1 and the ground 17 in accordance with the application of the load capacitance Co, the surface of the resistive film 1 can be coated by an insulating film for protecting the resistive film 1 from mechanical wear or scratching.

Figure 4A:
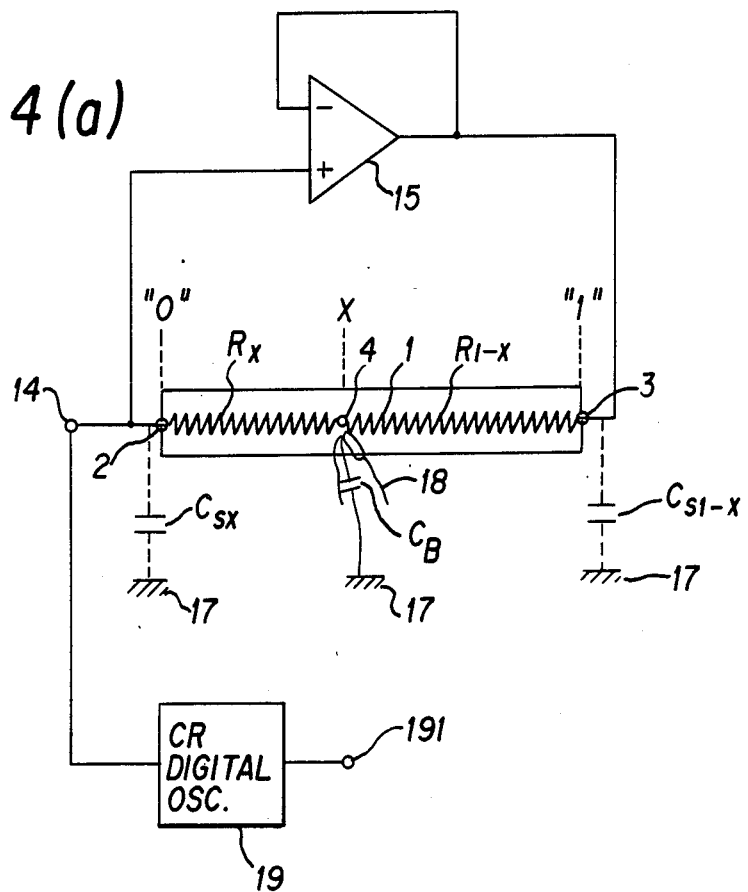
FIGS. 4(a) and 4(b) illustrate circuit configurations for explaining the operation of a second embodiment of the present invention.
Figure 4B:
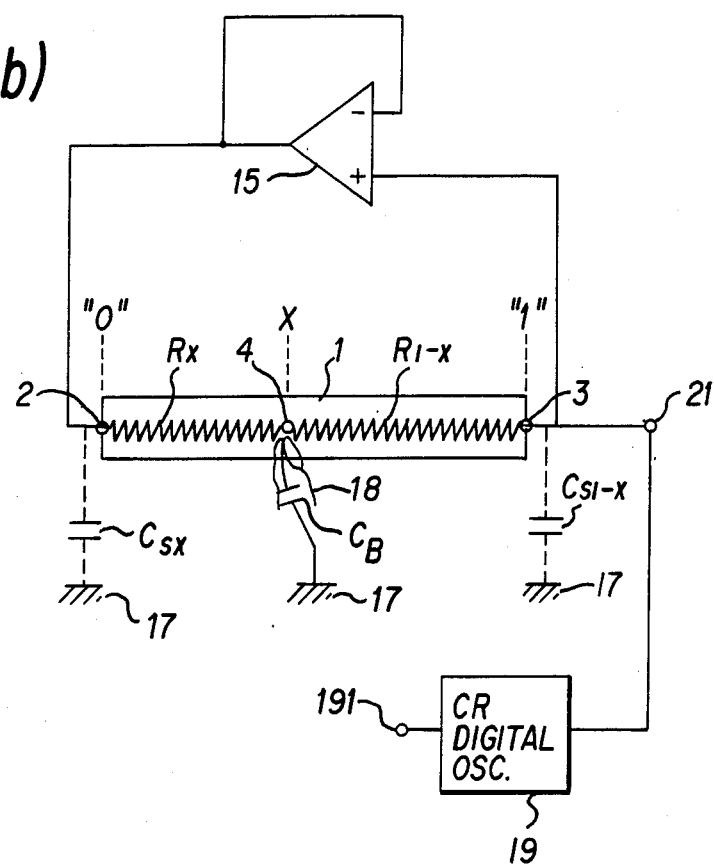

FIGS. 4(a) and 4(b) are circuit configurations for explaining the principle of the second embodiment of the present invention. Based on the principle as explained with reference to FIG. 2, however, this embodiment permits the determination of a coordinate x on an input panel by using a load impedance having an unknown value. That is, in this embodiment, it is not necessary to measure the value of the load impedance. In other words, this embodiment is intended to provide a coordinate detecting apparatus substantially operable with the use of a load impedance whose value is unstable.

In the first embodiment shown in FIG. 3, the load impedance, i.e., the capacitance Co, should be constant during a sequence from the time when an input pen touches the end 2 for determining the value Co to the time when the input pen touches the position of an arbitrary point 4 on the resistive film 1. The sequence will take at least a few seconds in a practical operation. To keep the load capacitance Co constant is easy if an input pen is used for indicating the point, but it is difficult if a touch of a fingertip is used instead of an input pen, because the load capacitance Co applied by a human body through a fingertip is apt to change with the contact pressure of a fingertip to the resistive film 1 and also with operator's sitting posture, for example. Moreover, the ends 2 and 3 have respective stray capacities with respect to the ground 17, in general. If the stray capacities are too large to be neglected, it is necessary to correct the equivalent capacitance C measured at the terminal 14 for the stray capacities.

In the coordinate detecting apparatus shown in FIGS. 4(a) and 4(b), a load capacitance (represented by $C_B$) is required constant only in very short time and is excluded from the process of the coordinate detection. Therefore, the load capacitance may be one which fluctuates and has an unknown value such as the floating capacitance of a human body to the ground 17.

In FIG. 4(a), the touch of the fingertip 18 applies a load capacitance $C_B$ to the point 4 whose coordinate x on the resistive film 1 is to be detected. The ends 2 and 3 have respective stray capacities $Cs_x$ and $Cs_{1-x}$ with respect to the ground 17. According to equation (12), the equivalent capacitance $C_{x1}$ between the terminal 14 and the ground 17 is expressed as follows:

$$C_{x1} = Cs_x + \{C_B R_{1-x}/(R_x + R_{1-x})\} \quad (17)$$

Equation (14) includes the stray capacity $Cs_x$ which stands in parallel to the equivalent capacitance $C_{x1}$. The stray capacity $Cs_{1-x}$ has been neglected because the end 3 is connected to the output of the op amp 15 whose output impedance can be assumed to be substantially zero. The CR digital oscillator 19 connected to the end 2 via the terminal 14 outputs signal pulses having a repetition period proportional to the equivalent capacitance $C_{x1}$.

FIG. 4(b) illustrates a situation where the respective connections of the input and output of the op amp 15 to the ends 2 and 3 are reversed, and the CR digital oscillator 19 is connected to the end 3 via a terminal 21. If the change of the connections between FIG. 4(a) and FIG. 4(b) is carried out in a very short time, for example, 5 ms, the fluctuation of the capacitance $C_B$ are negligibly small. Hence, in the configuration of FIG. 4(b), the equivalent capacitance $C_{x2}$ between the terminal 21 and ground 17 is expressed by using the same load impedance $C_B$ as follows:

$$C_{x2} = Cs_{1-x} + C_B\{R_x/(R_x + R_{1-x})\} \quad (18)$$

Equation (18) includes the stray capacity $Cs_{1-x}$ which stands in parallel to the equivalent capacitance $C_{x2}$. At this time, the stray capacity $Cs_x$ at the end 2 has been neglected because the end 2 is connected to the output of the op amp 15 having an output impedance of substantially zero.

As mentioned above, the switching from the circuit configuration shown in FIG. 4(a) to that shown in FIG. 4(b) is carried out in a very short time, and the capacitances in equations (17) and (18) can be assumed to be constant. Hence, by eliminating $C_B$ from the equations (17) and (18), the following equation is obtained.

$$R_{1-x} = \{(C_{x1} - Cs_x)/(C_{x2} - Cs_{1-x})\}R_x \quad (19)$$

By combining this relationship with equation (8), the coordinate x of the point 4 is given as follows:

$$x = R_x/(R_x + R_{1-x}) \quad (20)$$
$$= (C_{x2} - Cs_{1-x})/\{(C_{x1} - Cs_x) + (C_{x2} - Cs_{1-x})\}$$

The coordinate detection of the second embodiment is performed according to equation (20). That is, the coordinate detecting apparatus of the second embodiment comprises switching means which provides for switching the connections of the circuit with the resistive film 1 from the configuration shown in FIG. 4(a) to that shown in FIG. 4(b) in a very short time and measuring means for measuring the respective equivalent capacitances $C_{x1}$ between the terminal 14 and the ground 17 and $C_{x2}$ between the terminal 21 and ground 17 and the respective stray capacities $Cs_x$ at the end 2 and $Cs_{1-x}$ at the end 3, in accordance with the operation of the switching means. The coordinate x of the point 4, to which a load capacitance $C_B$ consisting of a floating capacitance of a human body is applied by touching a fingertip 18, is determined by substituting the measured values of the capacitances $C_{x1}$, $C_{x2}$, $Cs_x$ and $Cs_{1-x}$ for the respective terms in equation (20).

These capacitances are detected by the CR digital oscillator 19 in FIGS. 4(a) and 4(b). The repetition period of output pulses from the terminal 191 of the CR digital oscillator 19 is proportional to the equivalent capacitance between the terminal 14 or 19 and the ground 17. The repetition period $T_{x1}$ of the output pulses in the configuration shown in FIG. 4(a) is given by $$T_{x1} = k\, C_{x1} \quad (21)$$

where k is a constant.

Similarly, the repetition period $T_{x2}$ of the output pulses in the configuration shown in FIG. 4(b) is given by $$T_{x2} = k\, C_{x2} \quad (22)$$

Thus, the equivalent capacitances $C_{x1}$ and $C_{x2}$ are detected as the repetition periods of respective output pulses from the terminal 191, as expressed by equations (21) and (22).

Referring to equation (17), the stray capacity $Cs_x$ is given as the equivalent capacitance $C_{x1}$ either when $C_B = 0$ or $R_{1-x} = 0$. This condition can be achieved by no touching of the fingertip 18 to the resistive film 1 in FIG. 4(a). Accordingly, in FIG. 4(a), the repetition period $Ts_x$ of the output pulses from the terminal 191 without touching the fingertip 18 to the resistive film 1 is expressed by $$Ts_x = k\, C's_x \quad (23)$$

where, $C's_x$ designates the relevant equivalent capacitance between the terminal 14 and ground 17.

Similarly, referring to equation (18), the stray capacity $Cs_{1-x}$ is given as the equivalent capacitance $C_{x2}$ without touching the fingertip 18 to the resistive film 1 of FIG. 4(b), and repetition period $T_{s1-x}$ of the output pulses from the terminal 191 is expressed by $$T_{s1-x} = k \, C'_{s1-x} \tag{24}$$

where $C'_{s1-x}$ designates the relevant equivalent capacitance between the terminal 21 and ground 17.

By substituting equations (21), (22), (23) and (24) for the respective terms in equation (20), the coordinate x of the point 4 is expressed as follows:

$$x = (T_{x2} - T_{s1-x}) / \{(T_{x1} - T_{sx}) + (T_{x2} - T_{s1-x})\} \tag{25}$$

As described above, in the second embodiment, the respective repetition periods in both configurations shown in FIGS. 4(a) and 4(b) are measured without application of a touch of the fingertip 18, and then, a touch of the fingertip 18 is applied to the resistive film 1. Thus, the coordinate of the point 4 indicated by the touch of the fingertip 18 is determined by substituting the values of the repetition periods measured according to equations (21), (22), (23) and (24) for the respective terms in equation (25) instead of corresponding equation (20) in which the coordinate is given by the respective capacitances. The key of this embodiment is the switching operation performed in a very short time between the circuits The practical configuration of the switching means for exchanging the respective connections of the input and output of the op amp 15 to the ends 2 and 3 of the resistive film 1 will be described with reference to the subsequent embodiment.

Figure 5:
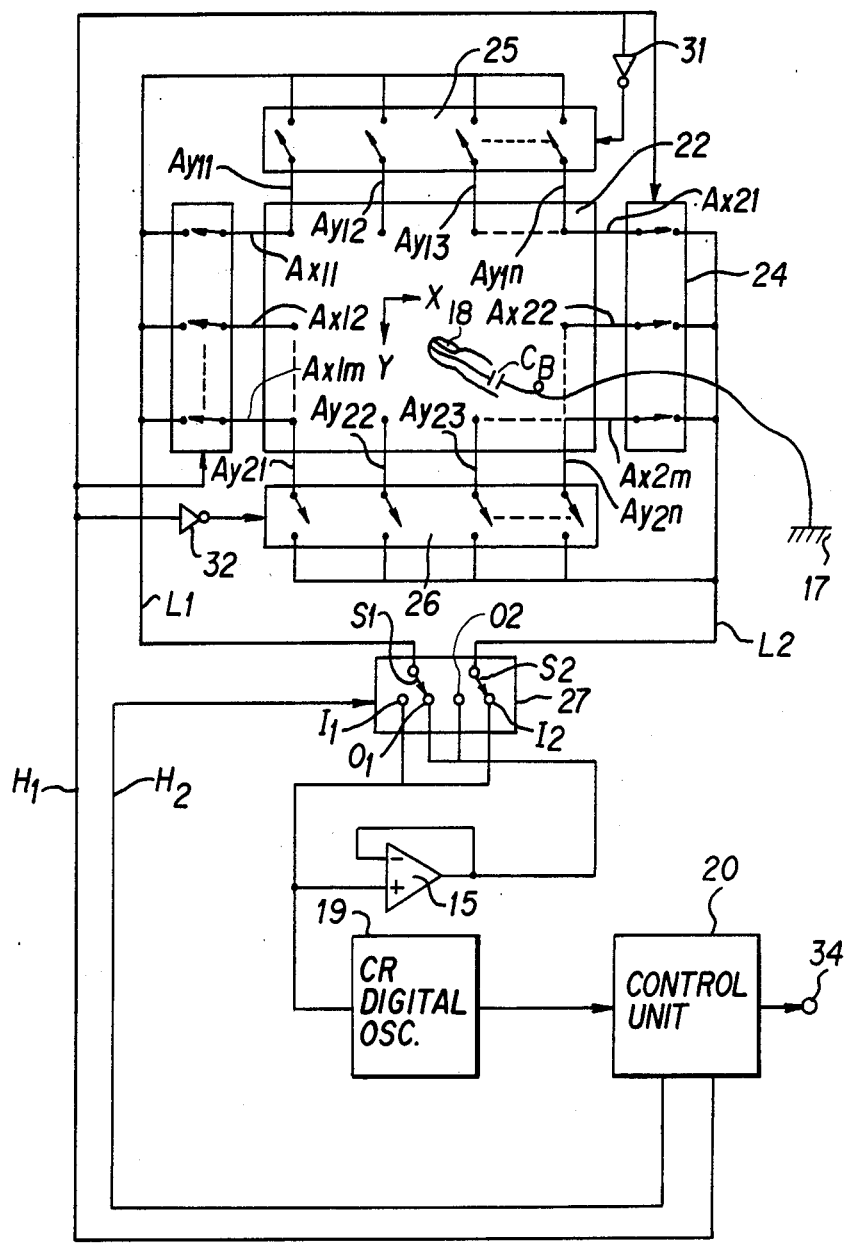
FIG. 5 illustrates a circuit configuration of a third embodiment of the present invention.

FIG. 5 illustrates a circuit configuration of the third embodiment of the coordinate detecting apparatus according to the present invention, wherein 2-dimensional coordinate detection is made possible.

In FIG. 5, an input panel (referred to as a touch panel, hereinafter) 22 has a structure comprising a transparent resistive film formed on a glass substrate and coated with an insulating thin film such as $SiO_2$. Referring to FIG. 5, the left end of the touch panel 22 is connected to a common line $L_1$ by switching lines $A_{x11}, A_{x12}, \ldots A_{x1m}$ of an analog switch array 23. The right end of the touch panel 22 is connected to another common line $L_2$ by switching lines $A_{x21}, A_{x22}, \ldots A_{x2m}$ of a second analog switch array 24. Further, the top end of the touch panel 22 is connected to the common line $L_1$ by switching lines $A_{y11}, A_{y12}, \ldots A_{y1n}$ of a third analog switch array 25. Likewise, the bottom end of the touch panel 22 is connected to the common line $L_2$ by switching lines $A_{y21}, A_{y22}, \ldots A_{y2n}$ of a fourth analog switch array 26. Each of the analog switch arrays 23, 24, 25 and 26 is referred to as second switching means.

The respective control signal inputs of the analog switches 23 and 24 are connected to a control signal line $H_1$ linked to a control unit 20 as shown in FIG. 10, and the respective control signal inputs of the analog switches 25 and 26 are connected to the control signal line $H_1$ through respective inverters 31 and 32. The common line $L_1$ is connected to the terminal $S_1$ of first switching means 27, and the terminal $S_1$ is selectively connected to the terminals $I_1$ and $O_1$. The common line $L_2$ is connected to the terminal $S_2$ of the first switching means 27, and the terminal $S_2$ is selectively connected to the terminals $I_2$ and $O_2$. The first switching means 27 may be an analog switching means, for example, comprising transfer contacts as shown in FIG. 5.

The control signal input of the first switching means 27 is connected to another control signal line $H_2$ linked to the control unit 20. The non-inverting input of op amp 15 is connected to the terminals $I_1$ and $I_2$ of the switching means 27 and also connected to the capacitor terminal of a CR digital oscillator 19. The inverting input and the output of the op amp 15 are connected to each other, and also connected to the terminals $O_1$ and $O_2$ of the switching means 27. The output of the CR digital oscillator 19 is connected to the input of a control unit 20 which outputs the detected coordinate data on its output terminal 34. The point whose coordinate on the touch panel 22 is to be detected is indicated by touching the fingertip 18 to the point. Thus, the point is applied with a load capacitance $C_B$ provided by the floating capacitance of a human body with respect to the ground 17. The capacitance $C_B$ involves the capacitive component relating to the $SiO_2$ film on the resistive film 1.

In the coordinate detecting apparatus having the configuration shown in FIG. 5, the analog switch arrays 23, 24, 25 and 26 operate to alternately establish a current path between the left end and right end of the touch panel 22 (i.e., the current path in the X direction) and between the top end and bottom end of the touch panel 22 (i.e., the current path in the Y direction). For example, when the analog switch arrays 23 and 24 are closed, the analog switch arrays 25 and 26 are opened. The op amp 15 constitutes a voltage follower circuit. The respective connections of the input and output of the op amp 15 to the common lines $L_1$ and $L_2$ are reversed by the first switching means 27 according to the signal on the control signal line $H_2$.

The coordinate detection operation in accordance with a touch of a fingertip 18 to the touch panel 22 is described below.

As a first sequence, a high level signal, for example, is provided from the control unit 20 to the control signal line $H_1$, and hence, the analog switch arrays 23 and 24 are closed, while the analog switch arrays 25 and 26 are opened due to the supply of a low level signal by the inverters 31 and 32. Thus, a current path is established in the X direction.

In the above, a high level signal, for example, is output from the control unit 20 and applied to the first switching means 27 via the control signal line $H_2$. And hence, the terminal $S_1$ is connected to the terminal $I_1$, and the terminal $S_2$ is connected to the terminal $O_2$. Accordingly, the connection between the op amp 15 and the touch panel 22 becomes equivalent to the circuit shown in FIG. 4(a). The CR digital oscillator 19 outputs signal pulses of repetition period $T_{x1}$ corresponding to the equivalent capacitance $C_{x1}$ between the left end of the touch panel 22 and the ground 17. The repetition period $T_{x1}$ is measured by a timer, and then, stored in a memory, both of the timer and memory are built in the control unit 20. The repetition period $T_{sx}$ corresponding to the stray capacity $C_{sx}$ at the left end of the touch panel 22 is measured without application of the touch of the fingertip 18, and stored, in advance, in the memory.

Following the above, the output signal from the control unit 20 to the control signal line $H_2$ switches to a low level, and the switching means 27 operates to connect the terminal $S_1$ to the terminal $O_1$, and the terminal $S_2$ to the terminal $I_2$. During this process, the high level of the signal on the control signal line $H_1$ is maintained, to hold the current path in the X direction. Accordingly, the connection between the op amp 15 and the touch panel 22 becomes equivalent to the circuit shown in FIG. 4(b). The CR digital oscillator 19 outputs signal pulses of repetition period $T_{x2}$ corresponding to the equivalent capacitance $C_{x2}$ between the right end of the touch panel 22 and the ground 17. The repetition period of $T_{x2}$ is measured by the timer, and then, stored in the memory of the control unit 20. The repetition period $Ts_{1-x}$ corresponding to the stray capacitance $Cs_{1-x}$ at the right end of the touch panel 22 is measured without the application of the touch of the fingertip 18, and stored, in advance, in the memory.

Using the values of $T_{x1}$, $T_{x2}$, $Ts_x$ and $Ts_{1-x}$ obtained as above, an arithmetic processor in the control unit 20 performs an operation according to equation (25), and thus, the coordinate in the left to right direction, i.e., X coordinate, of the point indicated by the touch of the fingertip 18 to the touch panel 22 is detected, and then, provided as an output from the terminal 34. In the above, the coordinate of the left end of the touch panel 22 is defined as "0" and the coordinate of the right end is defined as "1".

As the second sequence, the output signal from the control unit 20 to the control signal line $H_1$ is switched to a low level, and the analog switch arrays 25 and 26 are closed, while the analog switch arrays 23 and 24 are opened. Hence, the current path is changed from the left and right direction to the top and bottom direction, i.e., the Y direction and the Y coordinate of a point indicated by the touch of the fingertip 18 is detected in the same manner as in the X coordinate detection, as described above. At this time, the coordinate of the top end of the touch panel 22 is defined as "0" and the coordinate of the bottom end is defined as "1".

As disclosed above, a high precision 2-dimensional coordinate value of a point indicated by the touch of the fingertip 18 to the touch panel 22 can be determined. The switching operation of the switching means 27 according to the signal on the control signal line $H_2$ is performed in a very short time, 1 ms, for example, and the switching of the analog switches 23, 24, 25 and 26 according to the control signal $H_1$ are performed every 2 ms, for example.

The following is the fourth embodiment of the present invention, wherein accuracy of the coordinate detection according to FIGS. 4(a) and 4(b) or FIG. 5 is further improved. In the preceding embodiments, the load capacitance $C_B$ provided by a floating capacitance of a human body, for example, is assumed to be constant during a short time such as 5 ms. However, the floating capacitance of a human body inevitably includes a fluctuation which limits the detection accuracy. In this embodiment, the coordinate of a point on the touch panel 22 is determined according to a statistical process based on the values obtained during plural successive measurements.

In the process of obtaining the coordinate x according to equation (25), plural (f times, for example) measurements for $T_{x1}$ and $T_{x2}$ are performed by repeating the first sequence (wherein $H_1$ is at a high level, for example) as described above. By representing each measured repetition period as $T_{x1i}$ and $T_{x2i}$, wherein i denotes integers 1, 2, ... f, the processor in the control unit 20 calculates the corresponding values of $(T_{x1i}-Ts_x)$ and $(T_{x2i}-Ts_{1-x})$ to each $T_{x1i}$ and $T_{x2i}$, and sums them up, respectively. That is, $$\sum_{i=1}^{f}(T_{x1i}-Ts_x) \text{ and } \sum_{i=1}^{f}(T_{x2i}-Ts_{1-x})$$

are obtained. In the above, $Ts_x$ and $Ts_{1-x}$ are assumed to be constant during the plural successive measurements.

Hence, coordinate x is determined as follows:

$$x = \sum_{i=1}^{f}(T_{x2i}-Ts_{1-x})/ \quad (26)$$

$$\left\{\sum_{i=1}^{f}(T_{x1i}-Ts_x)+\sum_{i=1}^{f}(T_{x2}-Ts_{1-x})\right\}$$

The control unit 20 outputs the value of the coordinate x from the output terminal 34 every f times of the measurement, Equation (26) is the weighted mean value of coordinates $x_i$ (i=1, 2, ... f) obtained in the f times of measurement, wherein $x_i$ is represented by $$x_i=(T_{x2i}-Ts_{1-x})/\{(T_{x1i}-Ts_x)+(T_{x2i}-Ts_{1-x})\} \quad (27)$$

Therefore, it can provide an accurate coordinate value by cancelling off the unevenness in the measured $T_{x1i}$ and $T_{x2i}$ due to the fluctuation of the load capacitance such as a floating capacitance of the human body.

The same process is performed on the detection of the Y coordinate.

As described above, in the second, third and fourth embodiment of the present invention, acquisition of data necessary for determining the coordinate is performed within a short time wherein the capacitance of a load can be assumed to be constant.

The analog switches 23, 24, etc. and the device for the switching means 27 are commercially available at low costs, therefore, the total cost of the coordinate detecting apparatus of the second, third or fourth embodiment of the present invention can still be lower than the conventional apparatus as shown in FIG. 1.

Figure 6:
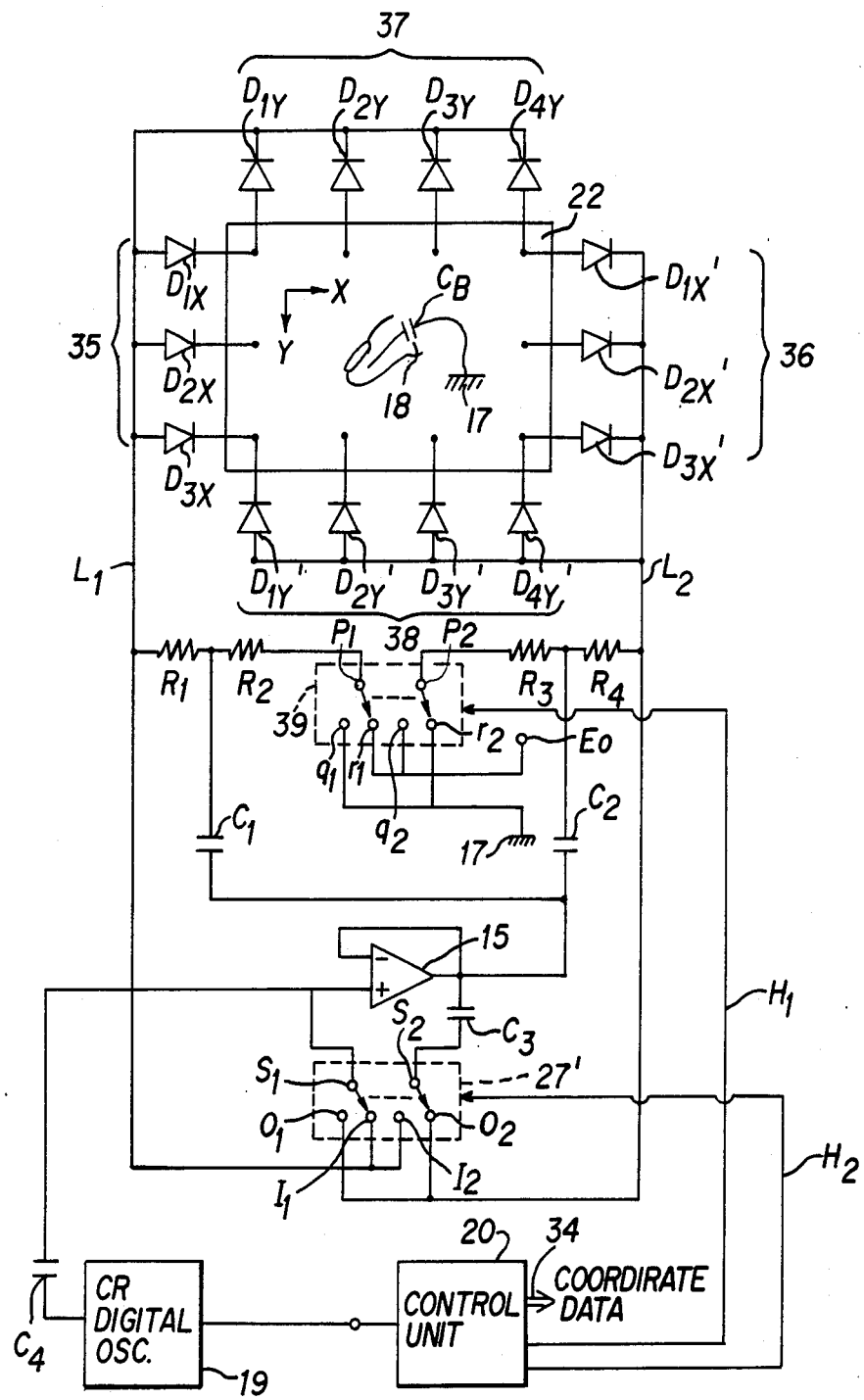
FIG. 6 illustrates a fifth embodiment of the present invention.

FIG. 6 illustrates the fifth embodiment of the present invention. This embodiment is a modification of the third embodiment shown in FIG. 5, and comprises a diode array, biasing means and bias switching means. The diode array forms the second switching means, instead of the analog switches 23, 24, 25 and 26 in the previous embodiment.

Referring to FIG. 6, each end of the touch panel 22 is provided with a diode array: a diode array 35 comprising diodes $D_{x1}$, $D_{x2}$, $D_{x3}$, ... for the left end; a diode array 36 comprising diodes $D_{x1'}$, $D_{x2'}$, $D_{x3'}$, ... for the right end; a diode array 37 comprising diodes $D_{y1}$, $D_{y2}$, $D_{y3}$, ... for the top end; a diode array 38 comprising diodes $D_{y1'}$, $D_{y2'}$, $D_{y3'}$, ... for the bottom end. The diodes in the diode arrays 35 and 36 are arranged to have a common forward direction, and the diodes in the diode arrays 37 and 38 are arranged to have a common forward direction. That is, for example, the diodes $D_{x1}$, $D_{x2}$, $D_{x3}$, ... are connected to the touch panel 22 through their cathodes, while the diodes $D_{x1'}$, $D_{x2'}$, $D_{x3'}$, ... are connected to the touch panel 22 through their anodes. Likewise, the diodes $D_{y1}$, $D_{y2}$, $D_{y3}$, ... are connected to the touch panel 22 through their anodes, while the diodes $D_{y1'}$, $D_{y2'}$, $D_{y3'}$, ... are connected to the touch panel 22 through their cathodes.

As shown in FIG. 6, the anodes of the diodes $D_{x1}$, $D_{x2}$, $D_{x3}$, . . . are connected to a common line $L_1$ together with the cathodes of the diodes $D_{y1}$, $D_{y2}$, $D_{y3}$, . . ., while the cathodes of the diodes $D_{x1'}$, $D_{x2'}$, $D_{x3'}$, . . . are connected to another common line $L_2$ together with the anodes of the diodes $D_{y1'}$, $D_{y2'}$, $D_{y3'}$, . . . Between the common lines $L_1$ and $L_2$, a bias voltage Eo is applied via bias switching means 39 having terminals p1, p2, q1, q2, r1 and r2. That is, the terminal p1 is connected to the common line $L_1$ via serially connected resistors $R_1$ and $R_2$, the terminal p2 is connected to the common line $L_2$ via serially connected resistors $R_3$ and $R_4$, the terminals q1 and r2 are connected to ground 17 and the terminals r1 and q2 of the bias switching means 39 are connected to a DC voltage source Eo referred to as a biasing means. The terminal p1 is selectively connected to the terminals q1 and r1 and the terminal p2 is selectively connected to the terminals q2 and 42, according to the signal provided by the control unit 20 via the control signal line $H_1$.

Capacitors $C_1$ and $C_2$ are respectively connected to the common node of the resistors $R_1$ and $R_2$ and the common node of the resistors $R_3$ and $R_4$ The respective opposite ends of the capacitors $C_1$ and $C_2$ are commonly connected to the output of the op amp 15. The non-inverting input of the op amp 15 is connected to the CR digital oscillator 19 via a capacitor $C_4$.

The first switching means 27' is substantially equivalent to the first switching means 27 in FIG. 5, however, its connection to the output of the op amp 15 is through a capacitor $C_3$. In the first switching means 27', the terminal $S_1$ is selectively connected to the terminals $I_1$ and $O_1$, and the terminal $S_2$ is selectively connected to the terminals $O_2$ and $I_2$, according to the signal provided by the control unit 20 via the control signal line $H_2$.

The operation of the circuit shown in FIG. 6 is as follows.

When a position on the touch panel 22 is indicated by the touching of the fingertip 18 to the position, the floating capacitance of a human body is applied thereto as a load capacitance $C_B$, and the bias switching means 39 operates to respectively connect the terminals p1 and p2 to the terminals r1 and r2, according to the signal from the control unit 20 via the control signal line $H_1$. Hence, the DC bias voltage Eo, of 12 volts for example, is applied to the common line $L_1$ via the resistors $R_2$ and $R_1$, and biases the diodes in the diode array 35 in the forward direction and the diodes in the diode array 37 in the reverse direction. The common line $L_2$ is connected to the ground 17 via the resistors $R_4$ and $R_3$, accordingly, the diodes in the diode array 36 are biased in the forward direction and, thus, a current path is established in the X direction on the touch panel 22.

In the above, the potential on the common line $L_1$ is higher than that on the common line $L_2$, therefore, the diodes in the diode array 38 are biased in the reverse direction and substantially are in an open state. Accordingly, current cannot flow from the diode array 38 to the diode array 37 on the touch panel 22.

During the time the bias switching means continues in the above state, the first switching means 27' operates to connect the input and output of the op amp 15 to the common lines $L_1$ and $L_2$, respectively, and then, operates to exchange the respective connections of the input and output of the op amp 15 to the common lines $L_1$ and $L_2$, according to the signal on the control signal line $H_2$. Thus, the repetition periods $T_{x1}$, $T_{x2}$, $Ts_x$ and $Ts_{1-x}$ of the output pulses from the CR digital oscillator 19 are measured and stored by the control unit 20, and the coordinate x of the point indicated by applying a touch of the fingertip 18 is determined according to equation (25) or (26) as described with reference to FIG. 5.

Following the above sequence, the bias switching means 39 operates to switch the terminals p1 and p2 to the terminals q1 and q2, respectively, according to the change of the signal on the control signal line $H_1$. Hence, the common line $L_1$ is connected to the ground 17 via the resistors $R_1$ and $R_2$, and the common line $L_2$ is connected to the bias voltage source Eo via the resistors $R_3$ and $R_4$ As a result, the diodes in the diode array 38 are biased in the forward direction and the diodes in the diode array 36 are biased in the reverse direction. The common line $L_1$ is connected to the ground 17 via the resistors $R_1$ and $R_2$, and the diodes in diode array 37 are biased in the forward direction and, thus, a current path is established in the Y direction. At this time, the potential on the common line $L_2$ is higher than that on the common line $L_1$, therefore, the diodes in the diode array 35 are biased in the reverse direction, and substantially are in an open state.

During this state, the first switching means 27' operates to change the respective connections of the input and output of the op amp 15 to the common lines $L_1$ and $L_2$, according to the signal on the control signal line $H_2$, and coordinate y of the point indicated by the touch of the fingertip 18 is determined according to the same procedure as in the detection of the coordinate x.

Figure 7:
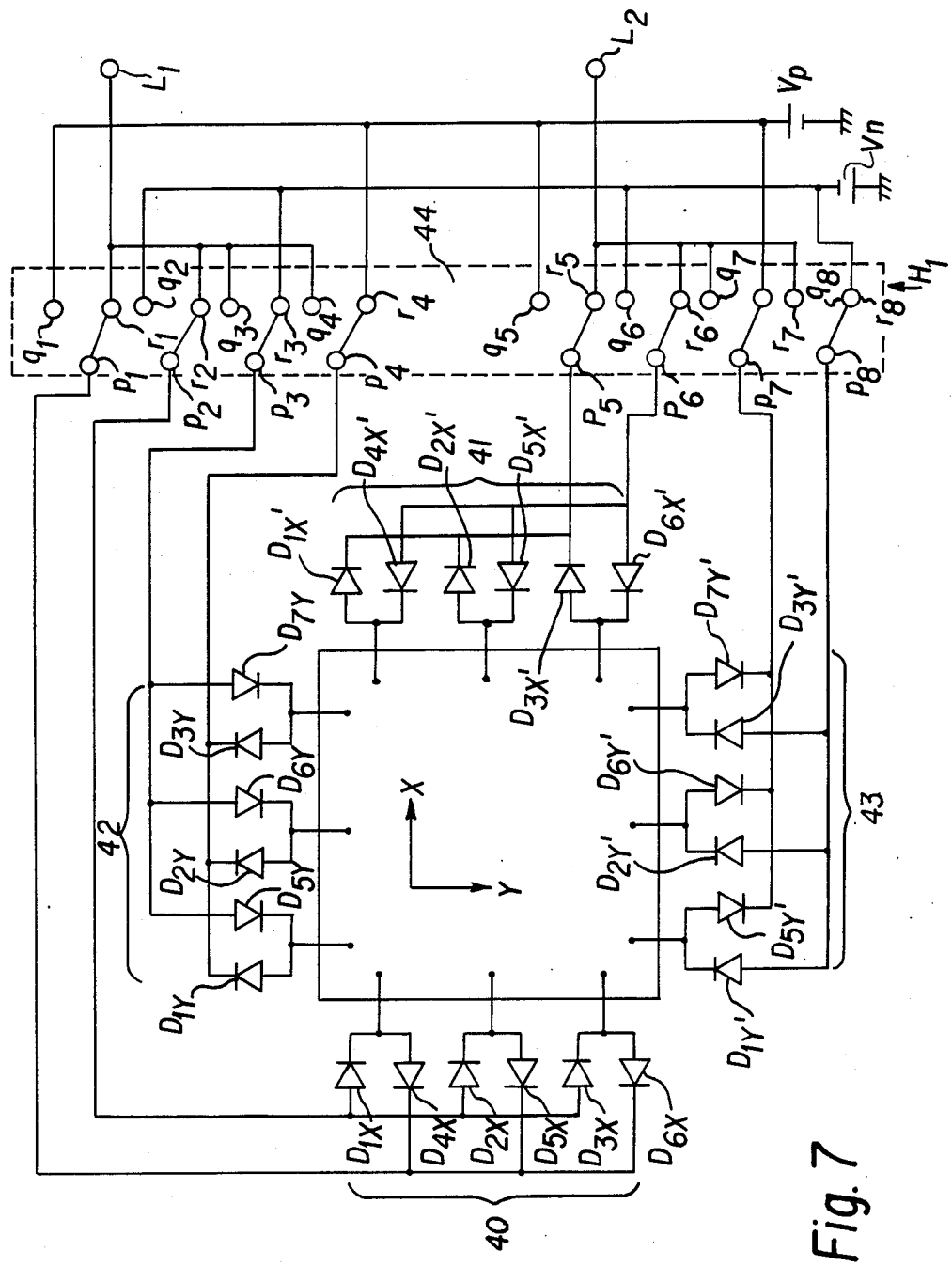
FIG. 7 illustrates a sixth embodiment of the present invention.

FIG. 7 illustrates the sixth embodiment of the present invention. This embodiment is a modification of the previous embodiment shown in FIG. 6, and intended to improve the operation speed of the previous embodiment.

The circuit of the coordinate detecting apparatus of FIG. 6 is provided with the capacitors $C_1$, $C_2$, $C_3$ and $C_4$, each having a relatively large capacitance, such as 0.1 uF. The capacitor $C_3$ is for blocking the DC bias voltage Eo from the common line $L_1$ or $L_2$ to the ground 17 through the output of the op amp 15 having a low output impedance of substantially zero. The capacitor $C_4$ is for blocking the DC bias voltage Eo to the input of the CR digital oscillator 19 through the common line $L_1$ or $L_2$. The necessity of the capacitors $C_1$ and $C_2$ arises from the requirement for preventing an AC signal component flowing along the common line $L_1$ or $L_2$ from shunting to the biasing voltage source Eo or the ground 17 via the circuit comprising the resistors $R_1$ and $R_2$, or $R_3$ and $R_4$. That is, the AC signal component is prevented from shunting to the resistors $R_1$ and $R_4$ if the respective ends of the resistors $R_1$ and $R_4$ are kept at the same AC signal voltage. This can be achieved by connecting the respective nodes of the resistors $R_1$ and $R_2$, and the resistors $R_3$ and $R_4$ to the output of the op amp 15, since the potentials on the input and output of the op amp 15 are equal. On the other hand, the output of the op amp 15 must be isolated from the DC bias voltage source Eo, as mentioned above, and, the capacitors $C_1$ and $C_2$ are provided to block the DC voltage applied to the output of the op amp 15 via the resistors $R_2$ and $R_3$.

In the above, each of the resistors $R_2$ and $R_3$ is selected to have a value for supplying an appropriate magnitude of DC bias current to the touch panel 22, and hence the values of the resistors $R_1$ and $R_4$ are selected to be small compared with the resistors $R_2$ and $R_3$.

However, these capacitors retard the time constant of the transient occurring in the output pulses from the CR digital oscillator 19 in accordance with the operation of the bias switching means 39, and the coordinate detection must wait until the prolonged transient is settled in every switching operation. In other words, the capacitors limit the maximum operation speed of the coordinate detecting apparatus as shown in FIG. 6. The time constant of the transient is primarily determined by $(C_1+C_4)R_2$ and $(C_2+C_3)R_3$, which correspond to approximately 2 ms. This means that 2-dimensional coordinate detection cannot be performed at a speed higher than 2 ms.

FIG. 7 shows a partial configuration of a coordinate detecting apparatus according to the sixth embodiment. Referring to FIG. 7, this embodiment comprises diode arrays 40, 41, 42 and 43, biasing means Vp and Vn, and bias switching means 44. Each of the diode arrays forms a second switching means.

The diode array 40 comprises diodes $D_{x1}$, $D_{x2}$, $D_{x3}$, $D_{x4}$, $D_{x5}$ and $D_{x6}$, and the diode array 41 comprises diodes $D_{x1'}$, $D_{x2'}$, $D_{x3'}$, $D_{x4'}$, $D_{x5'}$ and $D_{x6'}$. The diodes $D_{x1}$, $D_{x2}$ and $D_{x3}$ are connected to the left end of the touch panel 22 through their cathodes, while their anodes are commonly connected to the terminal p2 of the bias switching means 44. The diodes $D_{x4}$, $D_{x5}$ and $D_{x6}$ are connected to the cathodes of the diodes $D_{x1}$, $D_{x2}$ and $D_{x3}$ through their anodes, respectively, while their cathodes are commonly connected to the terminal p1 of the bias switching means 44. Thus, the diode array 40 is associated with the left end of the touch panel 22. Similarly, the diodes $D_{x1'}$, $D_{x2'}$ and $D_{x3'}$ are connected to the right end of the touch panel 22 through their anodes, while their cathodes are commonly connected to the terminal p5 of the bias switching means 44. The diodes $D_{x4'}$, $D_{x5'}$ and $D_{x6'}$ are connected to the anodes of the diodes $D_{x1'}$, $D_{x2'}$ and $D_{x3'}$ through their cathodes, respectively, while their anodes are commonly connected to the terminal p6 of the bias switching means 44. Thus, the diode array 41 is associated with the right end of the touch panel 22.

The diode array 42 comprises diodes $D_{y1}$, $D_{y2}$, $D_{y3}$, $D_{y4}$, $D_{y5}$ and $D_{y6}$, and the diode array 43 comprises diodes $D_{y1'}$, $D_{y2'}$, $D_{y3'}$, $D_{y4'}$, $D_{y5'}$ and $D_{y6'}$. The diodes $D_{y1}$, $D_{y2}$ and $D_{y3}$ are connected to the top end of the touch panel 22 through their anodes, while their cathodes are commonly connected to the terminal p4 of the bias switching means 44. The diodes $D_{y4}$, $D_{y5}$ and $D_{y6}$ are connected to the anodes of the diodes $D_{y1}$, $D_{y2}$ and $D_{y3}$ through their cathodes, respectively, while their anodes are commonly connected to the terminal p3 of the bias switching means 44. Thus, the diode array 42 is associated with the top end of the touch panel 22. Similarly, the diodes $D_{y1'}$, $D_{y2'}$ and $D_{y3'}$ are connected to the bottom end of the touch panel 22 through their cathodes, while their anodes are commonly connected to the terminal p8 of the bias switching means 44. The diodes $D_{y4'}$, $D_{y5'}$ and $D_{y6'}$ are connected to the cathodes of the diodes $D_{y1'}$, $D_{y2'}$ and $D_{y3'}$ through their anodes, respectively, while their cathodes are commonly connected to the terminal p7 of the bias switching means 44. Thus, the diode array 43 is associated with the bottom end of the touch panel 22.

It is obvious that each of the diode arrays in FIG. 7 comprises three pairs of diodes, serially connected, but the number of the diodes may be any appropriate number.

In the bias switching means 44 in FIG. 7, each of the terminals p1, p2, . . . p8 selectively connects to corresponding terminals $q_i$ and $r_i$, wherein i=1, 2, . . . 8, in accordance with the signal applied from the control unit 20 via the control signal line $H_1$ as shown in FIG. 6. The terminals q1, r4, q5 and r7 are commonly connected to a positive voltage source Vp which is the biasing means. The terminals r1, r2, q3 and q4 are connected to the common line $L_1$ shown in FIG. 6, and the terminals r5, r6, q7 and q8 are connected to the common line $L_2$ shown in FIG. 6. The terminals q2, r3, q6 and r8 are commonly connected to a negative voltage source Vn which is the biasing means. The common lines $L_1$ and $L_2$ are alternately connected to the input and output of the op amp 15 in FIG. 6.

In the above configuration, when the terminals p1, p2, . . . p8 are connected to the respective $r_i$ (i=1, 2, . . . 8) terminals as shown in FIG. 7, the diodes in the diode arrays 42 and 43 are biased in a reverse direction and are substantially in open states, and only the diodes in diode arrays 40 and 42 associated with the ends in the X direction are biased in the forward direction and made conductive. Thus, the data corresponding to the coordinate x of a point indicated on the touch panel 22 can be acquired.

Following the above, when the terminals p1, p2, . . . p8 are connected to the respective $q_i$ (i=1, 2, . . . 8) terminals, the diodes in the diode arrays 40 and 41 are biased in a reverse direction and are substantially in open states, and only the diodes in the diode arrays 42 and 43 associated with the ends in the Y direction are biased in the forward direction and made conductive. Thus, the data corresponding to the coordinate y of the point on the touch panel 22 can be acquired.

Figure 8:
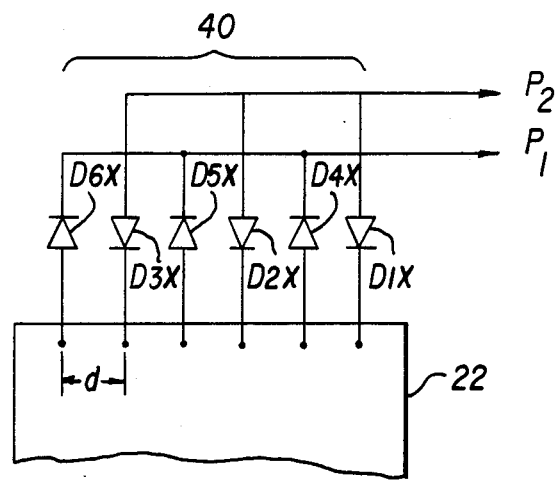
FIG. 8 illustrates a modification of the embodiment described with reference to FIG. 7.
Figure 9:
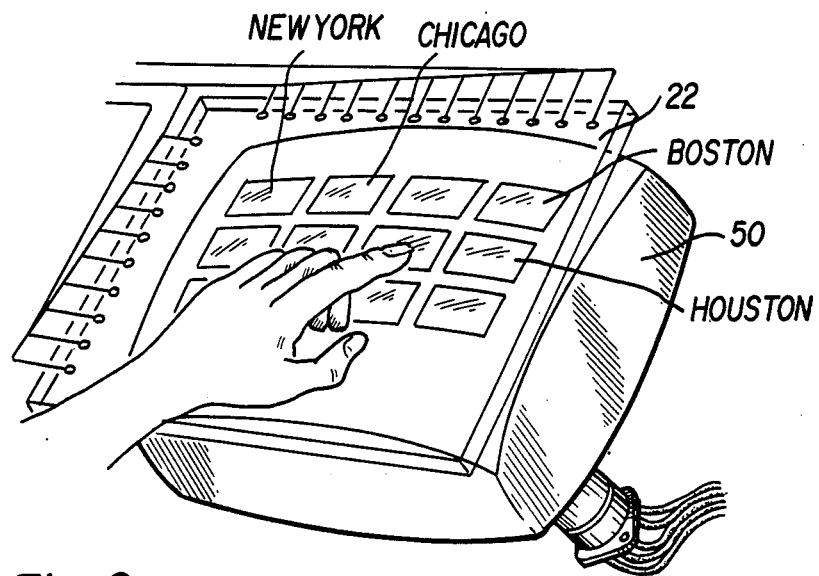
FIG. 9 shows a touch panel stacked on a display device.

In the above, the positive bias voltage Vp and negative bias voltage Vn should be set to have respective magnitudes larger than the peak voltage of the signal flowing through the load capacitance $C_B$ to the ground 17. Each of the serially connected diodes in each diode array may be separately connected to the corresponding end of the touch panel 22 as shown in FIG. 8. Although only the diode array 40 is illustrated in FIG. 8, the connections of the diodes $D_{x1}$, $D_{x2}$, $D_{x3}$, $D_{x4}$, $D_{x5}$ and $D_{x6}$ to the end of the touch panel 22 are separated from each other with a specified spacing d. The common connection of the anodes of the diodes $D_{x1}$, $D_{x2}$ and $D_{x3}$ to the terminal p2 and the common connection of the cathodes of the diodes $D_{x4}$, $D_{x5}$ and $D_{x6}$ to the terminal p1 are the same as shown in FIG. 7. The touch panel 22 in FIGS. 5 to 8 is usually stacked on a display device 50 as shown in FIG. 9, and is used to input the coor data of the displayed information under the touched point.

The many features and advantages of the present invention are apparent from the detailed specification, and thus, it is intended by the appended claims to cover all such features and advantages of the embodiments which fall within the true spirit and scope of the invention. Further, since numerous modifications and applications of the present invention will readily occur to those skilled in the art, for example, coordinate detection of a light beam spot or detection of incident angle of a light beam by an input panel comprising a resistive film and a photoconductive film stacked thereon, or coordinate detection of a pressure point by an input panel comprising a resistive film and a pressure sensitive film stacked thereon, it is not desired to limit the invention to the exact constructions and operations illustrated and described, accordingly, all suitable modifications and equivalents may be restored to, falling within the scope and spirit of the invention.

What is claimed is:

1. An apparatus for detecting the coordinate of a point on a plane, comprising:
   a resistive film means forming the plane, said resistive film means having an effective region used for the coordinate detection, said effective region being substantially rectangular and having a pair of ends disposed in a direction in parallel to a relevant coordinate axis;
   a buffer means having an input and an output, said input being connected to one end of said film means and said output being connected to the other end of said film means, said buffer means having substantially infinite impedance and unit voltage gain; and
   measuring means connected to said input of said buffer means, to measure an impedance between an end of said film means and ground,
   wherein the point, whose coordinate on the plane is to be detected, is indicated by applying a load to the point.

2. A coordinate detecting apparatus according to claim 1, including load means connected between said point to be detected and ground.

3. A coordinate detecting apparatus according to claim 2, wherein said measuring means measures the impedance when said load means is applied to said point to be detected and an other impedance when said load means is applied to the end of said film means operatively connected to the input of said buffer means.

4. A coordinate detecting apparatus according to claim 2, wherein said measuring means measures the impedance when said load means is applied to said point be detected and a third impedance when a load is not applied to said film means.

5. A coordinate detecting apparatus according to claim 3 or 4, wherein said measuring means measured respective capacitance between each end of said film means and ground.

6. A coordinate detecting apparatus according to claim 5, wherein said measuring means includes a CR oscillator.

7. A coordinate detecting apparatus according to claim 2, further comprising:
   first switching means for operatively reversing the connections of the input and output of said buffer means to the ends of said film means.

8. A coordinate detecting apparatus according to claim 1, wherein the effective region of said resistive film means has another pair of ends disposed in the direction in parallel to another coordinate axis.

9. A coordinate detecting apparatus according to claim 8, further comprising:
   second switching means for alternately establishing a conduction path between the first pair of ends of said film means and between the second pair of ends of said film means, said second switching means being connected between said buffer means and each of the ends of said film means.

10. A coordinate detecting apparatus according to claim 9, wherein said second switching means comprises a diode array having a plurality of diodes in parallel to one another, connected to each of the ends of said film means, each of said diodes connected to a respective one of the paired ends of said film means having a common forward direction.

11. A coordinate detecting apparatus according to claim 9, wherein said second switching means comprises a diode array having a plurality of diodes connected to each of the ends of said film means, wherein adjacent diodes have alternately different forward directions.

12. A coordinate detecting apparatus according to claim 11, wherein every other adjacent diode has a common connection to an end of said film means.

13. A coordinate detecting apparatus according to any one of claims 10, 11 or 12, further comprising:
   biasing means for operatively biasing said diodes of said diode arrays connected to the paired ends of said film means; and
   bias switching means connected between said biasing means and said diode arrays to alternately bias said diodes of said diode arrays connected to different paired ends of said film means.

14. A coordinate detecting apparatus according to any one of claims 1 to 4 and 7 to 12, wherein said resistive film means is optically transparent.

15. A coordinate detecting apparatus according to any one of claims 1 to 4 and 7 to 12, wherein said resistive film means is coated with an insulating material.

16. A coordinate detecting apparatus according to claim 15, wherein said insulating material on said resistive film means is optically transparent.

17. A coordinate detecting apparatus according to claim 1, wherein said buffer means is a voltage follower circuit.

18. A coordinate detecting apparatus according to claim 1, wherein said resistive film means includes a plurality of films stacked on the surface of a display device.

19. A coordinate detecting apparatus according to claim 1, wherein said measuring means includes a timer for measuring the repetition period of input signal pulses.

20. A coordinate detecting apparatus according to claim 7, wherein said measuring means stores each impedance value obtained in accordance with the operation of said first switching means and performs arithmetic operations to derive a mean value of the stored impedance values.

* * * * *

UNITED STATES PATENT AND TRADEMARK OFFICE
CERTIFICATE OF CORRECTION

PATENT NO. : 4,680,430  Page 1 of 2
DATED : July 14, 1987
INVENTOR(S) : YOSHIKAWA et al It is certified that error appears in the above-identified patent and that said Letters Patent is hereby corrected as shown below:

Column 3, line 46, "centrol" should read --control--.

Column 8, line 35, "19" should read --21--.

Column 13, line 18, "42" should read --r2--.

Column 16, line 52, "coor" should read --coordinate--.

Column 17, line 39, "measured" should read --measures--.

Figure 5 should appear as shown on the attached sheet.

Signed and Sealed this

Nineteenth Day of April, 1988

Attest:

DONALD J. QUIGG

Attesting Officer   Commissioner of Patents and Trademarks